United States Patent [19]
Haquet et al.

[11] Patent Number: 5,978,660
[45] Date of Patent: Nov. 2, 1999

[54] FREQUENCY DIVERSITY PROCESS AND DEVICE FOR AN SHF CARRIER

[75] Inventors: Gérard Haquet, Beton; David Harrison, La Bouexiére; Ali Louzir, Rennes, all of France

[73] Assignee: Thomas multimedia SA, Boulogne, France

[21] Appl. No.: 08/769,922

[22] Filed: Dec. 19, 1996

[30] Foreign Application Priority Data

Dec. 29, 1995 [FR] France ................................ 95 15741

[51] Int. Cl.$^6$ ................................................ H03C 7/02
[52] U.S. Cl. ................................................ 455/101; 375/38
[58] Field of Search ........................ 455/101; 375/204, 375/38; 380/34

[56] References Cited

U.S. PATENT DOCUMENTS 4,606,047  8/1986  Wilkinson ................................ 375/38
5,084,901  1/1992  Nagazumi ................................ 375/204

FOREIGN PATENT DOCUMENTS 2573594  5/1986  France ........................... H04K 3/00
2132451  7/1984  United Kingdom ............ H04K 3/00

*Primary Examiner*—William Cumming
*Attorney, Agent, or Firm*—Joseph S. Tripoli; Peter M. Emanuel; Kuniyuki Akiyama

[57] ABSTRACT

Wireless transmission process and apparatus include a frequency diversity process for carrying out spectral spreading of a modulated SHF (Super High Frequency) carrier. The modulated SHF carrier transports information between a transmitter and at least one receiver. The frequency of the SHF carrier is varied continuously in a specified band so as to transmit to the receiver a signal having a spectrum containing a plurality of frequencies representing a plurality of uncorrelated signals each transporting the information to be transmitted.

7 Claims, 8 Drawing Sheets

FREQUENCY DIVERSITY PROCESS AND DEVICE FOR AN SHF CARRIER

FIELD OF THE INVENTION

The present invention refers to the field of wireless transmissions and relates particularly to a frequency diversity process making it possible to carry out spectral spreading of a modulated SHF (Super High Frequency) carrier of frequency $f_p$ intended to transport information between a transmitter and at least one receiver. This spectral spreading is carried out in a manner known per se, by continuously varying the frequency $f_p$ within a specified band so as to transmit, between a transmitter and at least one receiver, a signal whose spectrum contains a plurality of frequencies representing a plurality of uncorrelated carriers.

The invention also relates to a transmitter intended to implement the process which is the subject of the invention.

BACKGROUND OF THE INVENTION

In the known wireless transmission processes based on modulating an SHF carrier, the signals transmitted by the transmitter reach the receiver along a plurality of separate paths. This results in interference at the receiver which may cause fadings of the signals transmitted and consequently a loss or degradation of the information to be transmitted.

FIG. 1 illustrates an example of the swings in the power received by a receiver according to a prior art process in a frequency band extending from 5.7 GHz to 5.9 GHz. As may be seen in this figure, the power curve exhibits several sudden drops signifying breaks or degradations in the transmitter-receiver link. The frequencies corresponding to the power minima vary according to the spatial position of the receiver, and for a given position, the power level may change over time as a function of the environment which may be modified by the movement of people for example. Such breaks or degradations are unacceptable in applications such as the transmission of sound between a television set and loudspeakers for example.

The solutions used in the prior art to solve this problem are generally based on techniques such as space diversity or frequency diversity. Space diversity consists in using a transmitting antenna and a plurality of receiving antennas spaced apart in such a way as to decorrelate the signals received. In addition to multiplying the number of receiving antennas used, this technique requires the use of a complex device for combining the signals received by the various antennas.

The technique based on conventional frequency diversity consists in using a separate transmitter for each carrier frequency. Moreover, good stability of each of the frequency sources is often necessary. Finally, in order to avoid the simultaneous fading of the various carriers, the width of the frequency band separating the said carriers should be greater than or equal to the width of the coherence band of the wireless channel used. Thus, within the coherence band, the signals received are very strongly correlated, and the effectiveness of conventional frequency diversity is very strongly diminished. Now, the width of the coherence band depends on the environment in which the transmission of the SHF signals is performed. Also, the diversity of conventional frequencies used in a given environment is not always suited to a different environment.

The purpose of the invention is to alleviate the drawbacks of the prior art. According to the process of the invention, the SHF carrier is amplitude-modulated by a VHF carrier of frequency $f_{AM}$, previously frequency-modulated by a signal $S_1$ representing the information to be transmitted, and simultaneously, the variations of the frequency $f_p$ are controlled by a sinusoidal signal $S_c$ of frequency $f_{FM}$.

By virtue of this process, the power received by the receiver is equivalent to the average of the powers received via the various carriers of the spectrum spread over the band B. Thus, the level of the signal received is held relatively constant, avoiding sudden fadings due to interference resulting from the multiple nature of the paths through which the signals are sent in the SHF range.

The process according to the invention is implemented by means of a transmitter including three stages mounted in cascade, namely an RF (radio frequency) stage for amplification/filtering of the signal S1, a VHF stage for frequency-modulation of the VHF carrier and an SHF stage for amplitude-modulation and frequency-modulation of the SHF carrier.

BRIEF DESCRIPTION OF THE DRAWING

Other characteristics and advantages of the invention will emerge from the description which follows, given by way of non-limiting example with reference to the appended figures in which

FIG. 3b represents diagrammatically a receiver associated with the transmitter of FIG. 3a;

FIG. 7 represents an SHF stage of the transmitter represented in FIG. 3a;

DESCRIPTION OF THE PREFERRED EMBODIMENT

Figure 1:
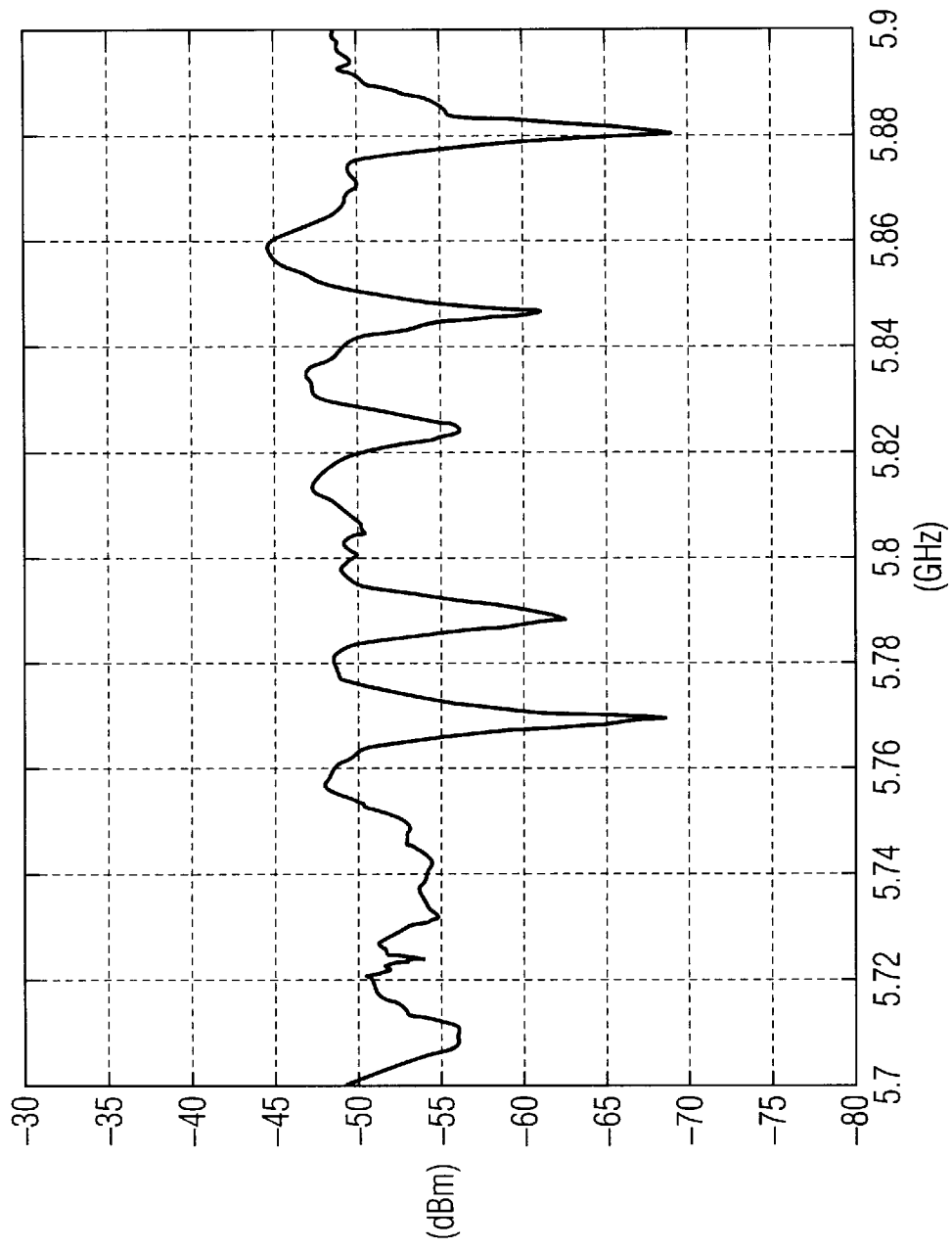
FIG. 1 represents a curve of variations in the power received by a receiver according to a wireless transmission process of the prior art.
Figure 2:
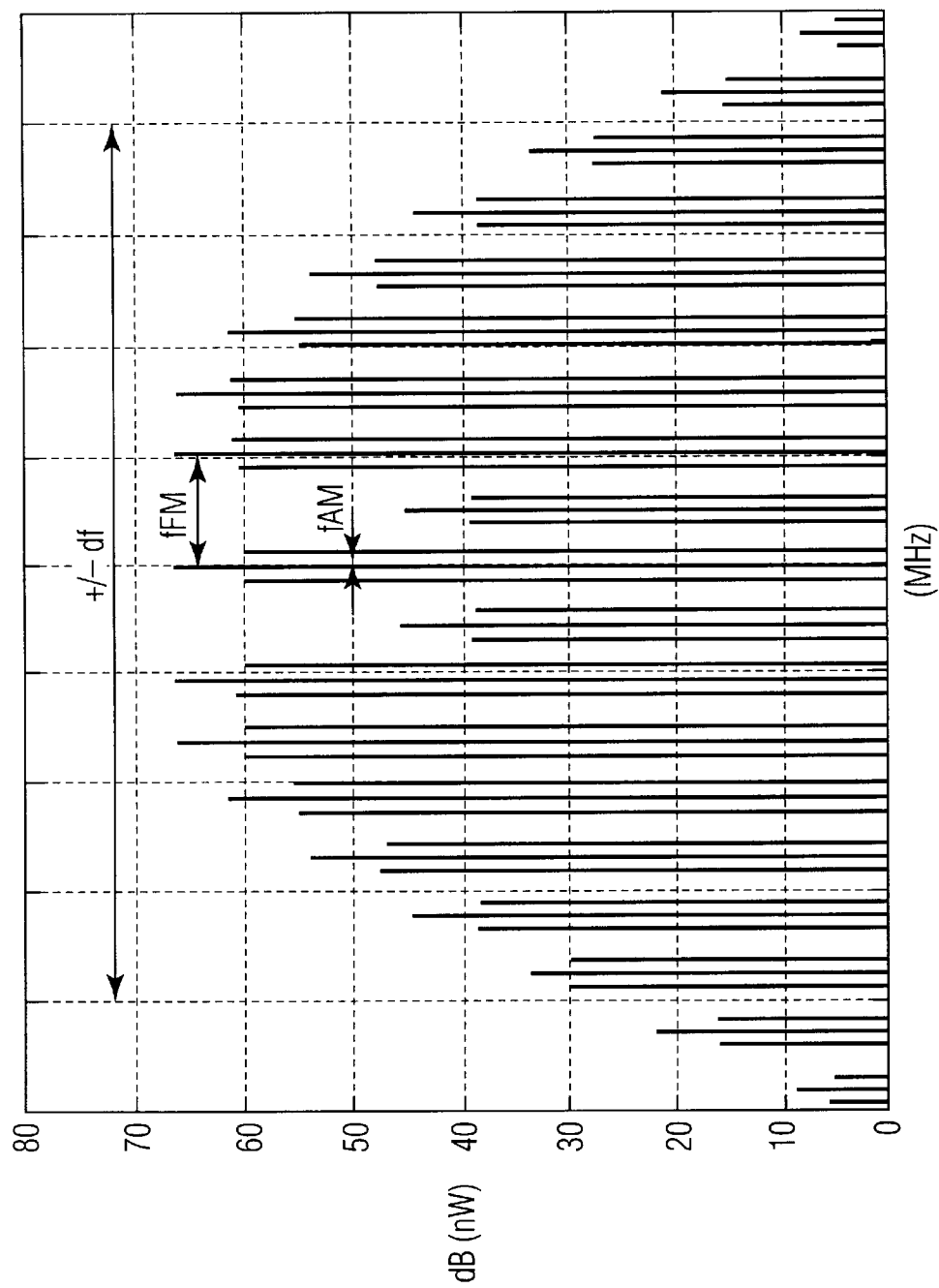
FIG. 2 represents a spread spectrum of a signal transmitted according to a process in accordance with the invention.
Figure 3A:
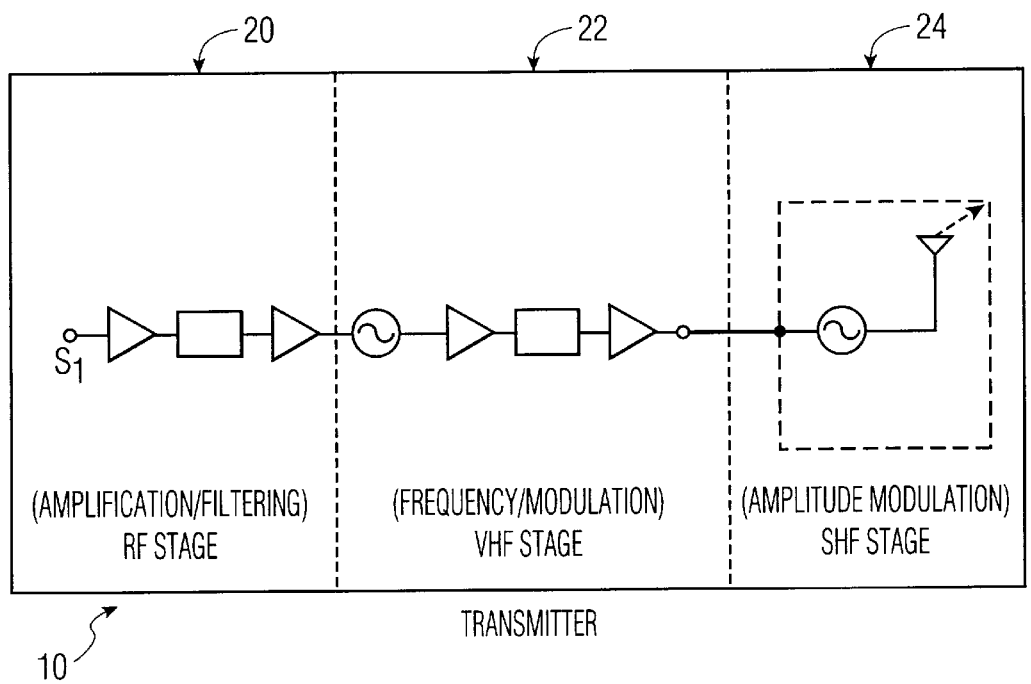
FIG. 3a represents diagrammatically a transmitter intended to implement a process according to the invention.
Figure 3B:
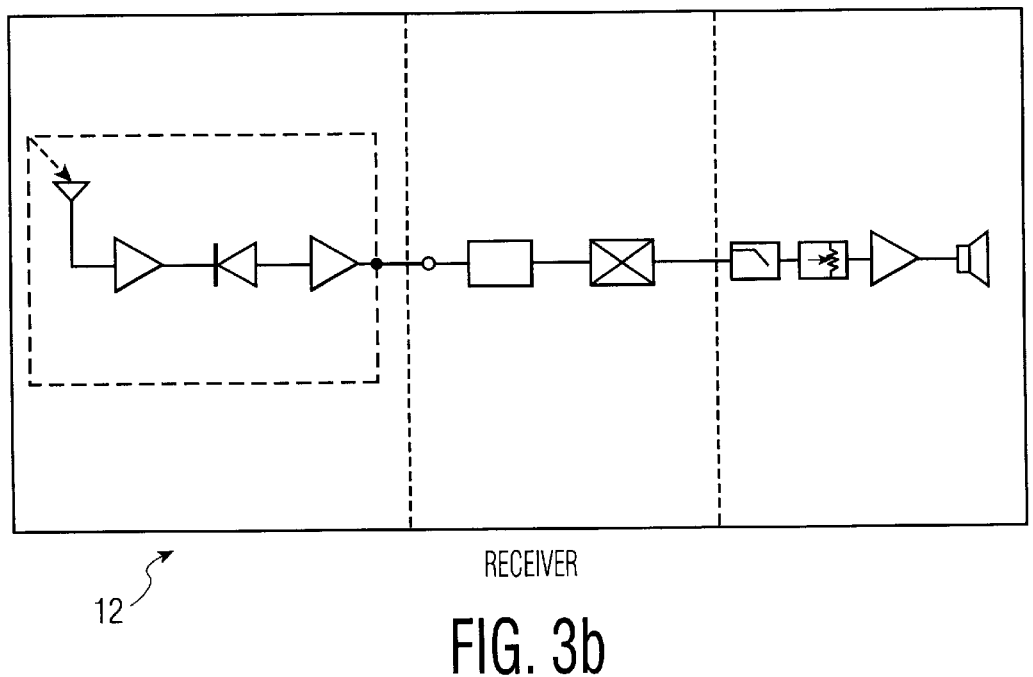
Figure 4:
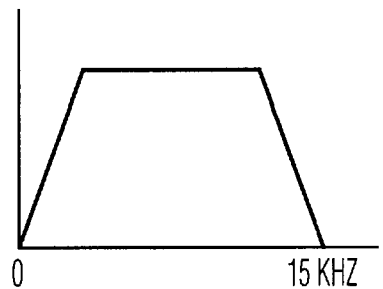
FIG. 4 represents a spectrum of an audio signal transmitted by means of a process and a transmitter according to the invention.
Figure 5:
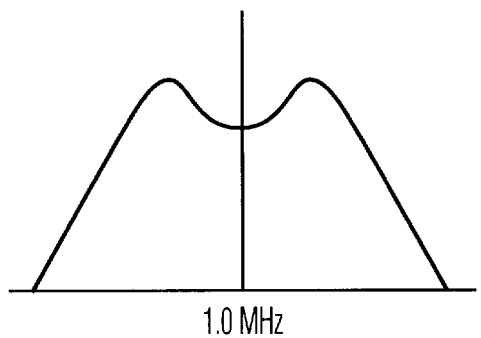
FIG. 5 represents a spectrum of a first carrier modulated by the signal whose spectrum is represented in FIG. 4.
Figure 6:
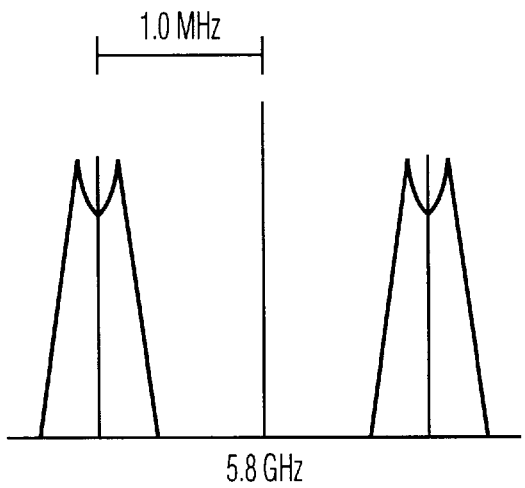
FIG. 6 represents a spectrum of a second carrier modulated by the first carrier whose spectrum is represented in FIG. 5.

FIG. 2 illustrates an example of a spread spectrum of an SHF carrier of frequency $f_p$ transmitted between a transmitter 10 and a receiver 12 according to a frequency diversity process characterized in that the frequency fp of the SHF carrier is varied continuously in a specified band B so as to transmit to the receiver 12 a signal having a spectrum containing a plurality of frequencies representing a plurality of uncorrelated carriers each transporting the information to be transmitted.

According to a preferred embodiment of the process of the invention, the SHF carrier is amplitude-modulated by a VHF (very high frequency) carrier of frequency $f_{AM}$, previously frequency-modulated by a signal $S_1$, representing the information to be transmitted, and simultaneously, the variations of the frequency $f_p$ of the SHF carrier are controlled by a sinusoidal signal $S_c$ of frequency $f_{FM}$ preferably chosen equal to $f_{AM}$, so as to carry out frequency-modulation of the said SHF carrier.

Figure 8:
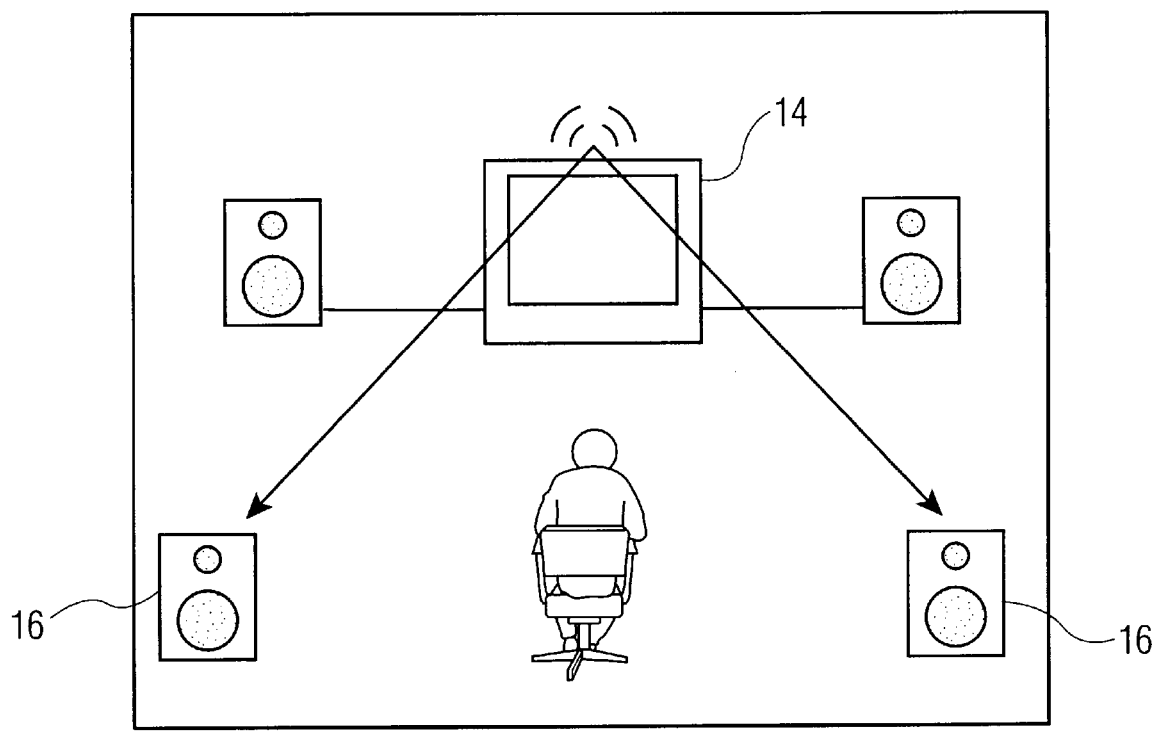
FIG. 8 illustrates diagrammatically an example of the environment for using a process according to the invention.
Figure 9:
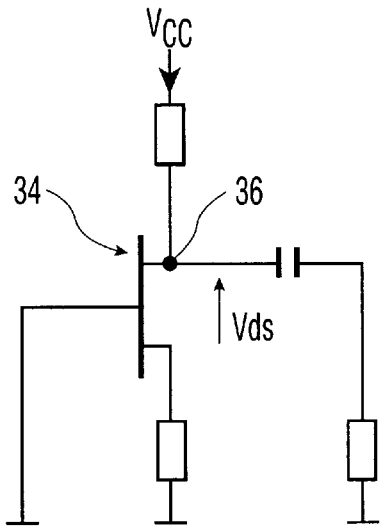
FIG. 9 represents diagrammatically a transistor and its bias circuit, used in the SHF stage of FIG. 7.

In a particular example of the application of the invention, illustrated in FIG. 8, the signal $S_1$, represents an audio signal sent by a transmitter arranged in a television set 14 to at least two receivers each arranged in a loudspeaker 16 situated some distance from the said television set 14. In this example application, the signal $S_c$ and the VHF carrier are identical and are generated by the same source, and the audio signal S1 frequency-modulates the said VHF carrier of frequency $f_{AM}$=1 MHz, which then modulates, simultaneously in amplitude and in frequency, an SHF carrier of frequency fp=5.8 GHz.

Measurements made in the environment depicted diagrammatically in FIG. 8 show that in a band B=±40 MHz about the frequency fp=5.8 GHz and for $f_{AM}$=$f_{FM}$=1 MHz, the intermodulation between the VHF carrier and the signal $S_c$ on the one hand, and the distortion losses of the signal transmitted on the other hand, are appreciably confined.

According to a preferred embodiment, the transmitter 10 implementing the process of the invention includes three stages mounted in cascade, namely an RF (radio frequency) stage 20 for amplification/filtering of the signal $S_1$, a VHF stage 22 for frequency-modulation of the VHF carrier and an SHF stage 24 for amplitude-modulation and frequency-modulation of the SHF carrier.

Figure 7:
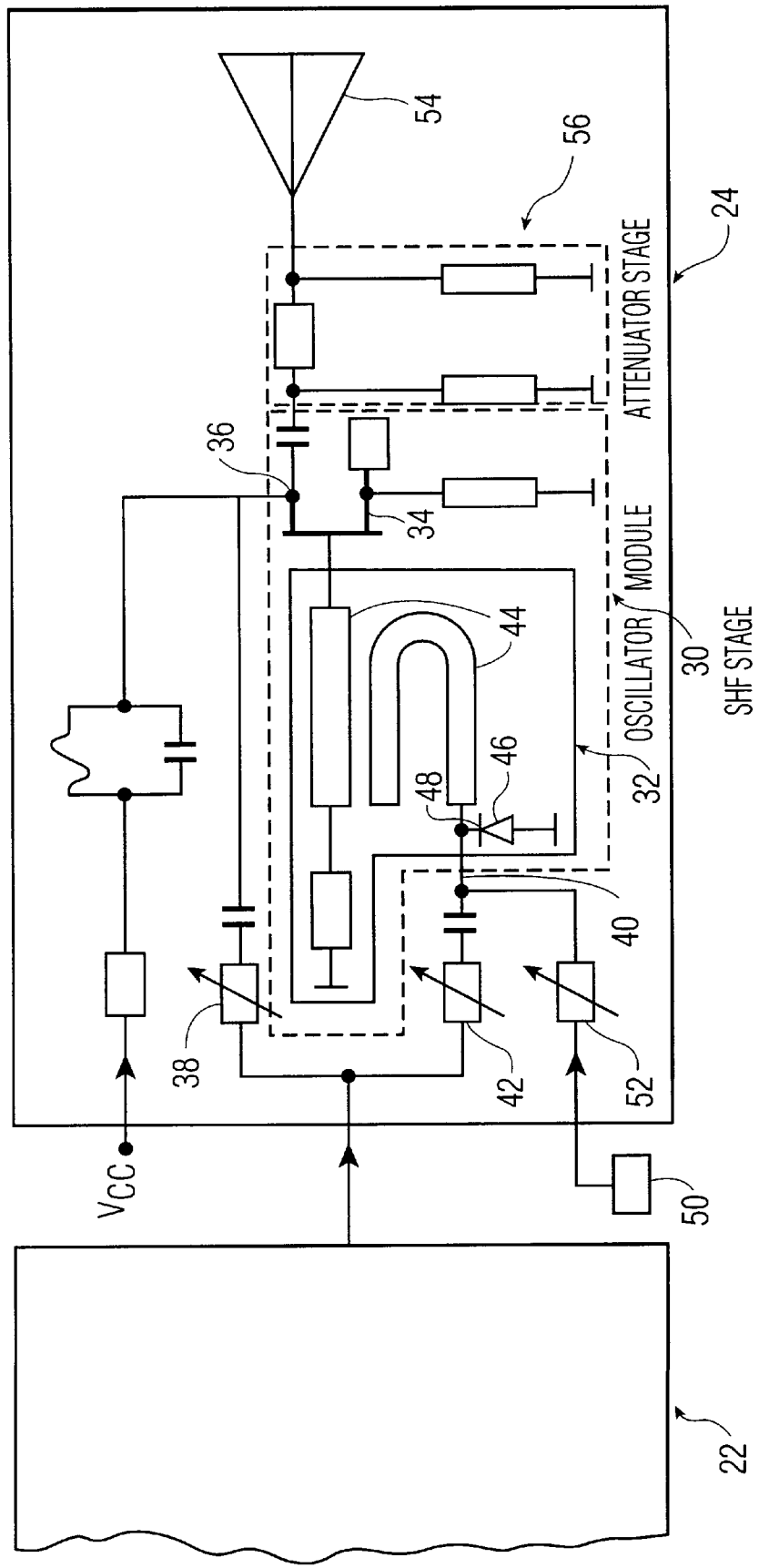

As may be seen in FIG. 7, the SHF stage 24 includes an oscillator module 30 intended to generate the SHF carrier and including a resonant circuit 32 associated with a transistor 34 of the FET (Field Effect Transistor) type. The drain 36 of the said transistor 34 is linked, on the one hand, to a DC voltage source Vcc, and on the other hand, to the VHF stage 22 via a first means of adjustment 38 of the amplitude of the VHF carrier. An input 40 of the oscillator 30 is linked to a second means of adjustment 42 making it possible to select the frequency excursion, within the band B, of the frequency-modulated and amplitude-modulated SHF carrier. The resonant circuit 32 includes a microstrip resonator 44 linked to a variable-capacitance diode 46 whose anode 48 is biased by a DC voltage source 50 via a third means of adjustment 52 making it possible, on the one hand, to adjust the width of the band B and, on the other hand, to compensate for the frequency drifting of the oscillator 30. The transistor 34 is linked to a sending antenna 54 via an attenuator stage 56.

By superimposing the signal $S_c$ on the DC bias voltage of the diode 46, continuous variations are produced in the frequency of resonance of the resonant circuit 32, and therefore, variations in the frequency of oscillation of the oscillator module 30.

Figure 10:
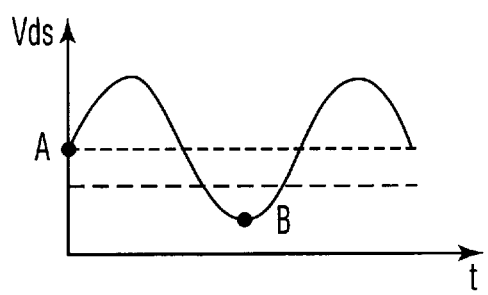
FIG. 10 represents an example of modulating the bias voltage of the transistor of FIG. 9.
Figure 11:
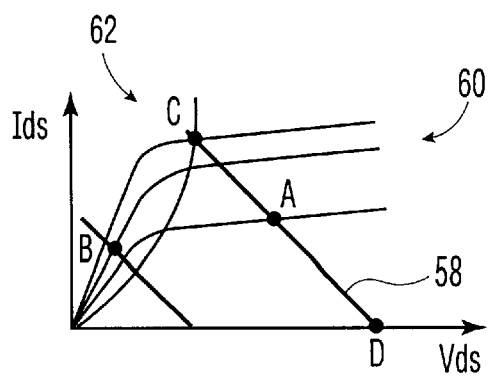
FIG. 11 represents the current-voltage characteristics of the transistor of FIG. 9.
Figure 12:
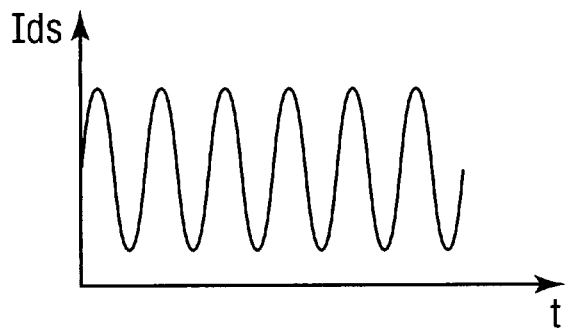
FIGS. 12 and 13 represent two examples of currents delivered by the transistor of FIG. 9.
Figure 13:
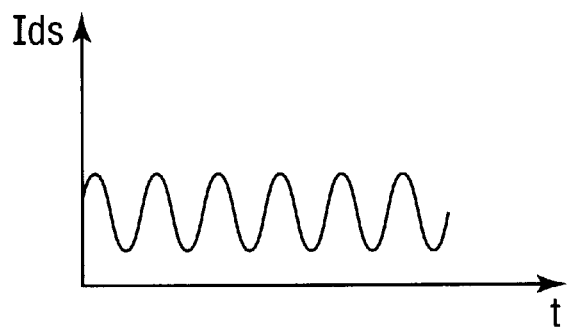
Figure 14:
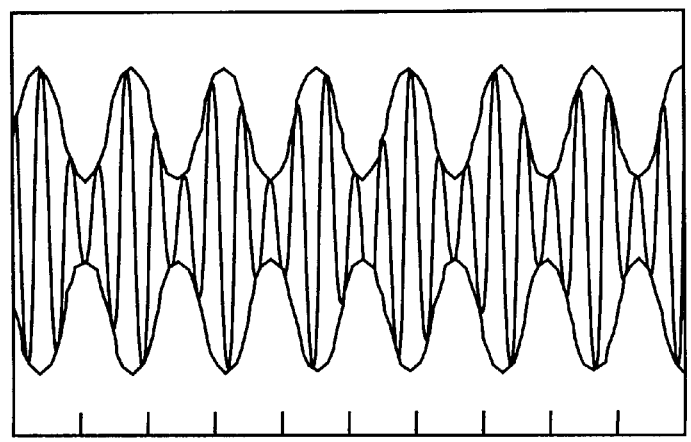
FIG. 14 represents an amplitude-modulated signal obtained via a preferred embodiment of the transmitter according to the invention.

FIG. 11 represents the current-voltage characteristics of the transistor 34 working in large-signal mode. The amplitude of the SHF carrier generated by the oscillator 30 is limited by the non-linearities of the transistor at the points C and D lying on the load line 58 of the said transistor 34. Thus, by applying the VHF carrier to the drain 36 of the transistor 34, the bias voltage of the said drain 36 is modified periodically as illustrated in FIG. 10. This prompts a shift in the bias point of the transistor 34 from its saturation operating region 60 to its linear operating region 62, as illustrated by points A and B in FIG. 11. FIG. 12 illustrates the case in which the bias point A is in the region 60 making it possible to obtain a drain current whose amplitude is a maximum, whilst FIG. 13 illustrates the case in which the bias point is in the region 62 causing a reduction in the amplitude of the said drain current. As was stated earlier, the amplitude modulation of the said SHF carrier, illustrated by FIG. 14, is obtained by applying the VHF carrier to the drain 36 of the transistor 34. The level of penetration of the bias point into the linear operating region 62 makes it possible to alter the index of modulation of the SHF carrier. The said level of penetration is controlled by the first means of adjustment 38 and depends on the amplitude of the VHF carrier.

The spread of the frequency spectrum of the modulated SHF carrier is altered via the third means of adjustment 52 making it possible to modify the DC bias voltage of the variable-capacitance diode 46 thus producing a variation in the value of the capacitance of the said diode 46.

The SHF stage according to the invention makes it possible, simultaneously, to generate the SHF carrier and to carry out amplitude-modulation and frequency-modulation of the said SHF carrier.

We claim:

1. Frequency diversity process making it possible to carry out spectral spreading of an SHF carrier of frequency $f_p$ by continuously varying the frequency $f_p$ within a specified band so as to transmit, from a transmitter (10) to at least one receiver (12), a signal whose spectrum includes a plurality of frequencies representing a plurality of uncorrelated carriers, characterized in that the SHF carrier is amplitude-modulated by a VHF carrier of frequency $f_{AM}$, previously frequency-modulated by a signal $S_1$, representing the information to be transmitted, and simultaneously, the variations of the frequency $f_p$ are controlled by a sinusoidal signal $S_c$ of frequency $f_{FM}$.

2. Process according to claim 1, characterized in that the signal $S_1$, represents an audio signal sent by a transmitter arranged in a television set (14) to at least two receivers each arranged in a loudspeaker (16) situated some distance from the television set (14).

3. Process according to claim 1, characterized in that the signal $S_c$ and the VHF carrier are generated by the same source and, $$f_p=5.8 \text{ GHz and } f_{AM}=f_{FM}=1 \text{ MHz}.$$

4. Process according to claim 1 characterized in that the frequency band B extends ±40 MHz about the frequency $f_p$=5.8 GHz.

5. Transmitter intended to implement the process according to claim 1 characterized in that it includes three stages mounted in cascade, namely an RF stage (20) for amplification/filtering of the signal $S_1$, a VHF stage (22) for frequency-modulation of the VHF carrier and an SHF stage (24) for amplitude-modulation and frequency-modulation of the SHF carrier.

6. Transmitter according to claim 5, characterized in that the SHF stage includes an oscillator module (30) including a resonant circuit (32) associated with a transistor (34) of the FET type, the drain (36) of which is linked, on the one hand, to a DC voltage Vcc, and on the other hand, to the VHF stage

(22) via a first means of adjustment (38) of the amplitude of the VHF carrier delivered by the said VHF stage (22).

7. Transmitter according to claim 6, characterized in that the resonant circuit (32) includes a microstrip resonator (44) associated with a variable-capacitance diode (46) whose anode (48) is linked, on the one hand, to a second means of adjustment (42) making it possible to select the frequency excursion, within the band B, of the frequency-modulated and amplitude-modulated SHF carrier, and on the other hand, to a third means of adjustment (52) making it possible on the one hand to adjust the width of the band B, and on the other hand to compensate for the frequency drifting of the oscillator (30).

* * * * *